Patented July 27, 1948

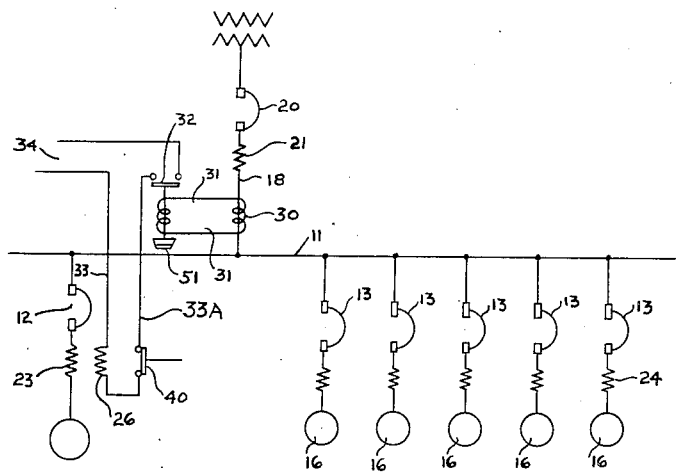

2,445,836

UNITED STATES PATENT OFFICE 2,445,836

UNLOADING CIRCUIT

Donald W. McCrosky, Lansdowne, Pa., assignor to I-T-E Circuit Breaker Company, Philadelphia, Pa., a corporation of Pennsylvania Application June 24, 1944, Serial No. 541,992

4 Claims. (Cl. 171—97)

My present invention relates to protective systems for electrical apparatus and more particularly to a system involving circut breakers where, under excess loads, less important loads may automatically be dropped to ensure continuity of operation and to prevent the entire system from being de-energized.

In the usual manufacturing plant, there are a number of feeders which supply light and power loads from a single source. Since these loads do not all operate at the same time, and since the capacity of each feeder breaker is chosen to protect the maximum load on the feeder, it is economically sound that the sum of the feeder breaker capacities exceed the capacity of the principal breaker which protects the main source of power, as for instance at the transformer.

In such an arrangement, however, should all the loads come on at the same time, the main breaker will be tripped and the entire plant will be de-energized.

This is obviously undesirable where connected loads are dependent on uninterrupted service.

My invention contemplates that tripping means be provided for the circuit breaker of a large, but relatively unimportant load so that when the current flow exceeds the capacity of the main breaker, this load will be tripped out and remain disconnected until the drop in the over-all power demand permits it to be connected once more.

This relatively unimportant but large load which may be de-energized momentarily may include ventilation blowers, heating equipment or ash removal conveyors, the momentary interruption of which would not seriously affect plant operation.

In most industrial plants the power contract usually has a "demand" clause. That is, the cost of power is dependent upon not only the power used but also upon the maximum demand as recorded by a demand meter. This meter reads the kilowatt demand over a 15 minute interval.

To keep down power costs it is frequently the practice to sound an alarm when the demand continues. By the use of this invention it is possible to cut off an unimportant load during a period of high demand and thus to keep down the power cost.

The object of my invention, therefore, is the provision of means in a power distribution system for automatically disconnecting a relatively large but unimportant load when the over-all power demand exceeds the capacity of the main circuit breaker.

This and many other objects of my invention will become apparent in the following specification and drawings in which Figure 1 is a schematic view showing a distribution system embodying my novel means for automatically disconnecting a large but relatively unimportant load should the over-all power demand exceed the capacity of the main circuit breaker.

Figure 2 is a schematic view showing a modification of my novel automatic load decreasing means.

Figure 3 is a schematic view showing a modified form of the novel systems of Figures 1 and 2.

Referring now to Figure 1, I have here shown a power source such as through the transformer 10 which supplies current for the bus 11, to which are connected the feeder breakers 12 and 13, 13 which protect the loads 15 and 16, 16.

The connector 18 between the secondary of transformer 10 and the bus 11 is provided with a main breaker 20 having the series overload coil 21. Breaker 12 is provided with series overload coil 23 and breakers 13 are each provided with series overload coils 24. The specific tripping mechanism operated by the overload coils in connection with this and the other circuit breakers of the system is not shown as this is well known mechanism in the art.

The main breaker 20 is chosen so that its capacity will match that of the transformer 10 and protects the transformer against overload by means of the series overload coil 21.

Ordinarily the connector 18 in prior systems would be connected directly to the bus 11.

In my novel system here shown, the connector 18 lead runs through an additional series trip coil 26 for breaker 12 before it is connected to bus 11.

The various loads 15 and 16 are light and power loads in a typical manufacturing plant or a large building. Since these loads are not all operating at the same time and since the capacity of each feeder breaker 12 or 13 is chosen to protect the maximum load on each feeder, it frequently happens in the construction of such systems, and it is definitely economical, that the sum of the feeder breaker capacities (12 and 13, 13) is much larger than the capacity of the main breaker 20. With the usual arrangement which was heretofore obtained, if the loads should all come on at the same time, the main breaker 20 and the transformer would become overloaded and breaker 20 would trip to protect the transformer.

In so doing, the entire plant load would become de-energized and all the equipment in the plant would stop running. This is obviously an undesirable condition where connected loads are dependent on uninterrupted service. Consequently the load 15 which is a relatively large load, but rather unimportant (such as, for instance, ventilation blowers, heating equipment or ash removal conveyors, the momentary interruption of which would not seriously affect plant operation) is so arranged that it may automatically be dropped when the total current demand of all of the loads 15 and 16 exceeds the capacity of the breaker 20. That is, the additional series trip coil 26 in the connector 18 is so arranged that it will be energized at a current value just below the current value at which the series trip coil 21 of the main breaker 20 would be energized.

At this value, the energization of the additional series trip coil 26 of the feeder breaker 12 will serve to trip the feeder breaker 12 and cut out the relatively large, but relatively unimportant load 15. As will be obvious, of course, the additional series trip coil 26 of the breaker 12 may be arranged with a time delay or other suitable means for controlling its operation so that it will operate only just before the series trip coil 21 of the main breaker 20 will operate.

Thus, it should be arranged to trip at a current value only slightly less than the current value necessary to trip the main breaker 20 and during a time interval only slightly shorter than that necessary to trip the main breaker 20.

In Figure 2 I have shown a modified arrangement where the same reference numbers are applied to similar parts. The only difference between the construction of Figure 2 and that of Figure 1 is that a current transformer 30 is used to energize the additional trip coil 26 of the breaker 12, the said current transformer 30 being energized by the connector 18. This will permit the use of much more economical conductors 31, 31 for the additional series trip coil 26, whereas in the Figure 1 construction, the conductors between the main breaker 20 and the trip coil 26 of the feeder breaker 12 must be heavy enough to carry the entire load. In the construction here shown, only relatively light conductors need be used.

In Figure 3 I have shown a still further modification of the construction of Figures 1 and 2, where again the same reference numbers have been applied to the same parts and where these parts require no further description since their function is the same as in the other figures. In this case the current transformer 30, through the conductors 31, closes a contactor relay 32, to supply voltage to the trip coil 26 over the conductors 33 from an external source of current 34.

In this case only a relatively low current and voltage need be used to energize the trip coil 26 since its only function is to trip the circuit breaker, and yet the control of the energization of the trip coil 26 is based on variations in the current passing through the conductor 18.

A principal advantage of this arrangement lies in the fact that it is more sensitive to load fluctuations and has a wider range of control. The control system for the additional trip coil 26 of breaker 12 may also be disconnected by means of the contact 40. That is, where it is desired that under no circumstances should the load 15 be tripped out unless, of course, the entire plant be shut down or under such circumstances where the load 15 becomes very important, then the contact 40 in the conductor 33a may be opened to prevent energization of the trip coil 26. Consequently, the breaker 12 will operate only on the current going through trip coil 23. This current is, of course, divided with the other feeders in proportion.

In appropriate circumstances, a time delay device such as the dashpot 50 may be added to the trip coil 26 of Figure 2 to provide any desired time delay, which time delay of course should be less than the time delay provided for the main breaker 20; otherwise the main breaker will trip first. Similarly, the relay 32 of Figure 3 may be provided with a time delay device such as the dashpot 51 for the same purposes.

Thus in its essence, the operation of the system depends on providing a relatively large, but relatively unimportant load with a circuit breaker having a series trip coil 23 adapted to trip at the maximum capacity of a breaker 12, which maximum is of course selected to protect the load 15; the same breaker 12, is however, provided with an additional trip coil 26 which reflects the conditions of the entire system and operates in accordance with variations in said conditions of the system as a whole.

Thus, the breaker 12 is adapted to trip selectively under two divergent conditions: (1) where the load 15 rises to an excessive point due to overloading of the load 15 or to overcurrent or fault conditions with respect to the load 15 and its leads; (2) when the current in the entire system rises to a value approaching that at which the main breaker 20 will trip to close down the entire system.

Of course it will be obvious that the sum of the loads 16 is just less than the capacity of the main breaker 20; while the sum of all the loads 16 together with the load 15 is much greater than the capacity of the main breaker 20. Consequently disconnecting load 15 when the total load through the main breaker 20 rises above the capacity of the main breaker 20 will prevent a shut-down of the plant. By this means a system is provided which automatically disconnects a selected load in the event that the entire load exceeds the capacity of the power source and the capacity of the main breaker which protects the same.

The operation depends on the provision of two tripping means for the particular load which is disconnected. One of the tripping means for the circuit breaker protecting that load operates on the conditions of that load alone. The other tripping means acting on the same circuit breaker operates pursuant to the conditions of the entire system.

In the foregoing I have described my invention in connection with schematic, preferred, specific embodiments thereof. It will be obvious that my protective system may be applied to various other types of distribution systems and is not necessarily limited to distribution systems in a single plant or to distribution systems in which only one load is to be disconnected.

It is obvious of course that my invention may be applied so that different loads may selectively be arranged to be disconnected in the event that the entire capacity of the system is exceeded, the said different loads being so arranged in accordance perhaps with the time of day and the relative importance of the particular operations being performed by those loads at that time.

Since many variations and modifications of my invention should now be obvious to those skilled in the art, I prefer to be bound not by these specific disclosures herein, but only by the appended claims.

I claim:

1. In a power supply system, a source of power supply, a feeder circuit connected thereto, a plurality of loads connected in parallel to said feeder circuit, a circuit breaker individual to each of said loads and connected in series with its individual load, each of said circuit breakers having an individual trip coil connected in series in its individual load circuit and responsive to circuit conditions therein for tripping its associated circuit breaker when fault currents flow in its associated circuit, a second trip coil individual to one of said circuit breakers in one of said load circuits and circuit connections for said second trip coil for energizing said second trip coil in accordance with circuit conditions in said feeder circuit so that said circuit breaker associated with said second trip coil is tripped when the load conditions call for a predetermined current from said source of power supply.

2. In a power supply system, a source of power supply, a feeder circuit connected thereto, a plurality of loads connected in parallel to said feeder circuit, a circuit breaker individual to each of said loads and connected in series with its individual load, each of said circuit breakers having an individual trip coil connected in series in its individual load circuit and responsive to circuit conditions therein for tripping its associated circuit breaker when fault currents flow in its associated circuit, a second trip coil individual to one of said circuit breakers in one of said load circuits, and a relay energized in accordance with the circuit conditions in said feeder circuit for controlling the energization of said second trip coil so that said circuit breaker associated with said second trip coil is tripped when the load conditions call for a predetermined current from said source of power supply.

3. In a power supply system, a source of power supply, a feeder circuit connected thereto, a plurality of loads connected in parallel to said feeder circuit, a circuit breaker individual to each of said loads and connected in series with its individual load, each of said circuit breakers having an individual trip coil connected in series in its individual load circuit and responsive to circuit conditions therein for tripping its associated circuit breaker when fault currents flow in its associated circuit, a second trip coil individual to one of said circuit breakers in one of said load circuits, circuit connections for said second trip coil for energizing said second trip coil in accordance with circuit conditions in said feeder circuit so that said circuit breaker associated with said second trip coil is tripped when the load conditions call for a predetermined current from said source of power supply, and means for rendering said second trip coil non-responsive to the current conditions in said power supply.

4. In a power supply system, a source of power supply, a feeder circuit connected thereto, a plurality of loads connected in parallel to said feeder circuit, a circuit breaker individual to each of said loads and connected in series with its individual load, each of said circuit breakers having an individual trip coil connected in series in its individual load circuit and responsive to circuit conditions therein for tripping its associated circuit breaker when fault currents flow in its associated circuit, a second trip coil individual to one of said circuit breakers in one of said load circuits, and a time delay relay energized in accordance with the circuit conditions in said feeder circuit for controlling the energization of said second trip coil so that said circuit breaker associated with said second trip coil is tripped when the load conditions call for a predetermined current from said source of power supply.

DONALD W. McCROSKY.

REFERENCES CITED

The following references are of record in the file of this patent:

UNITED STATES PATENTS

| Number | Name | Date |
|---|---|---|
| 1,352,451 | Hayes | Sept. 14, 1920 |
| 1,558,448 | Anderson | Oct. 20, 1925 |
| 1,673,116 | Jenkins | June 12, 1928 |
| 1,743,115 | Clark | Jan. 14, 1930 |
| 1,768,607 | Keilholtz | July 1, 1930 |